Patented Sept. 25, 1945

2,385,547

UNITED STATES PATENT OFFICE 2,385,547

PROCESS FOR PREPARATION OF ACETYLENIC ALCOHOLS

Everet F. Smith, Terre Haute, Ind., assignor to Commercial Solvents Corporation, Terre Haute, Ind., a corporation of Maryland No Drawing. Application November 29, 1943, Serial No. 512,261

9 Claims. (Cl. 260—638)

My invention relates to a process for the preparation of acetylenic alcohols. More particularly, it relates to a process capable of producing high yields of the desired acetylenic alcohol by the utilization of a novel type of menstruum for the involved reaction.

It has been known for some time that acetylenic alcohols can be prepared by absorbing an acetylenic hydrocarbon in a suspension of finely-ground, substantially anhydrous potassium hydroxide in an ether compound chosen from the class consisting of acetals and polyethers, then adding a suitable carbonyl compound, and thereafter hydrolyzing the resultant acetylenic alcohol potassium derivative to the desired product. In this particular procedure, the reaction menstruum is prepared by adding finely-divided, substantially anhydrous potassium hydroxide to the ether compound at ordinary temperatures, ranging usually up to 35° C.; and after the completion of the process, an aqueous solution of potassium hydroxide remains, from which the potassium hydroxide must be isolated in the anhydrous state and pulverized for reuse. This is the chief disadvantage of the process. It will readily be apparent to those skilled in the art that such a requirement renders this process substantially useless from an industrial point of view, since it is not economically feasible to recover large quantities of anhydrous potassium hydroxide from aqueous solution by conventional methods, and then to pulverize it under anhydrous conditions for reuse. Furthermore, the yields of acetylenic alcohol obtained by this process, per unit volume of reactor space, are very poor.

I have now discovered that acetylenic alcohols may be synthesized in very high yields and conversions by employing a reaction menstruum prepared by heating a mixture consisting of potassium hydroxide, an inert liquid, and a small proportion of a monohydric alcohol, until said potassium hydroxide is in a partially or completely molten state, and thereafter cooling in the presence of agitation. In its preferred embodiment, the process of the present invention first involves the addition of an inert, water-immiscible liquid with the desired proportion of monohydric alcohol to an aqueous solution of potassium hydroxide, and the removal of the water therefrom by distillation of the azetrope with said inert liquid and alcohol, the latter being thereafter separated from the distillate and returned to the still kettle. This operation is continued until no more water distills over. The still residue thus obtained is not completely anhydrous, but on the contrary, contains approximately 13 per cent water. This water, however, does not behave like free water; it cannot be removed by further distillation, and is apparently loosely combined with the potassium hydroxide in the form of a hydrate. The latter conclusion is considered highly probable in view of the fact that the potassium hydroxide thus obtained melts between 104° and 106° C., whereas pure potassium hydroxide melts at approximately 380° C. In this connection, the expression "free water" hereinafter referred to, is to be construed as meaning only that water which may be removed from the above-mentioned mixtures by distillation of the water azeotrope. It should be pointed out, however, that while I prefer to utilize a reaction menstruum that contains substantially no free water, my process is operative and improved results can still be obtained with menstruums having a water content of up to slightly below one mole per mole of potassium hydroxide. On the other hand, finely-divided anhydrous potassium hydroxide may be employed in the process of my invention with highly satisfactory results. Chiefly for economic reasons, however, potassium hydroxide in this form is generally not desirable, especially since good results are obtained with the hydroxide containing approximately 13 per cent water and produced in the manner indicated above.

After all of the excess water has been removed, a mixture is obtained which consists of two liquid layers, the upper layer containing chiefly the inert liquid and alcohol, and the lower layer consisting essentially of potassium hydroxide with 13 per cent water. This mixture is thoroughly agitated and cooled to a temperature of from about −10° C. to about +10° C. In this connection it may be mentioned that although the aforesaid temperature range has generally been found preferable, I may utilize temperatures ranging from slightly above the freezing point of the potassium hydroxide-containing mixture to about 35° C. When the desired temperature is reached a 1-alkyne having a hydrogen atom in the one-position is slowly introduced at a temperature within the aforesaid range until said 1-alkyne is no longer absorbed by the mixture. The desired carbonyl compound is then added thereto in an amount approximately equal to the number of moles of alkyne, and as a result, the potassium derivative of the corresponding acetylenic alcohol is formed. After this step in the process is complete, water is added to the mixture in order to hydrolyze the aforesaid derivative to the parent acetylenic alcohol. The crude reaction mixture thus obtained is then subjected to fractional distillation under vacuum, the latter being sufficiently high to reduce the boiling point of the acetylenic alcohol-water azeotrope to a value below the temperature at which said alcohol decomposes in the presence of alkali, such temperature of distillation normally being not appreciably above 90° C. Generally, pressures of 500 mm. or below will be required for this purpose. As a result of this distillation, a mixture of acetylenic alcohol and water is obtained. The water may then be conveniently removed in a known manner by adding thereto a liquid which forms an azeotrope with water, and thereafter subjecting said mixture to fractional distillation. Examples of liquids suitable for this purpose are benzene, toluene, xylene, and the like.

While the above-described procedure constitutes a preferred form of my invention, I have found that solid potassium hydroxide may be substituted for the aforesaid aqueous solutions thereof, with highly satisfactory results. If potassium hydroxide containing less than 13 per cent water is used, it must first be pulverized. The resulting powder is then suspended in the mixture of alcohol and inert liquid, and the slurry is agitated and heated until partial fusion occurs. Thereafter, the mixture is cooled in the presence of agitation, and the resulting menstruum is utilized in the same manner as described in the foregoing paragraph.

Solid potassium hydroxide containing 13 per cent water or more may be introduced directly without being pulverized into the mixture of alcohol and inert liquid, and the resulting mixture heated until substantially complete fusion of the potassium hydroxide occurs. The minimum required temperature has been observed to vary inversely as the proportion of water, being approximately 105° C. for potassium hydroxide containing 13 per cent water. A two-phase liquid mixture results, composed essentially of the alcohol and the inert liquid in the upper layer, and potassium hydroxide and water in the lower layer. The mixture is then cooled in the presence of agitation, and the resulting menstruum is utilized in the manner hereinbefore described.

With either of the above procedures, it should be pointed out that the mixture of potassium hydroxide, alcohol, and inert liquid must be heated and then cooled prior to absorption of the 1-alkyne and reaction of the resulting product with a carbonyl compound, in order for the process to be operative.

One of the outstanding advantages of the process provided by my invention resides in the relatively high yield of product per unit volume of reaction menstruum. In general, the yields obtainable when employing my procedure are up to three times as great per unit volume of reaction menstruum as those secured by prior-art methods.

Insofar as I have been able to determine, substantially any monohydric alcohol may be utilized in the reaction menstruum of my invention. In general, however, I have found it preferable to use alcohols having from three to eleven carbon atoms. As examples of these alcohols, there may be mentioned methanol, 1-propanol, 1-butanol, 2-butanol, methylallyl alcohol, 1-pentanol, isoamyl alcohol, 4-methyl-2-pentanol, 1-octanol, 2-octanol, undecanol, cyclohexanol, tetrahydrofurfuryl alcohol, 2-phenylethyl alcohol, 3-phenylpropyl alcohol, phenol, tertiary-butyl alcohol, and the like. It is to be specifically understood also that the term "monohydric alcohol," as used in the present description, is to be construed to include, in addition to the above-mentioned alcohols, other compounds containing an alcohol group, such as, for example, ethylene glycol monoethyl ether, diethylene glycol monoethyl ether, and the like. The proportion of alcohol utilized may vary considerably. However, it has been my general observation that entirely satisfactory results are consistently obtained when from about 2 to 35 per cent of the alcohol, based upon the total volume of the reaction menstruum, is utilized.

The optimum temperature employed in condensing the carbonyl compound with the 1-alkyne will in general be found within the range of about −10° and +90° C., the carbonyl compounds of higher molecular weight ordinarily requiring higher reaction temperature for satisfactory results.

As far as I have been able to determine, the applicability of the process of the present invention is restricted to carbonyl compounds which do not tend to undergo extensive and undesirable side reactions in the alkaline menstruum utilized. Aliphatic ketones are not deleteriously affected by such a reaction medium, and therefore it is to be specifically understood that such ketones, as a class, are operative in the process of my invention. In addition, as examples of aldehydes that are operative in my process, there may be mentioned butyraldehyde, hexaldehyde, heptaldehyde, 2-ethylhexaldehyde, and the like.

In preparing the reaction menstruums of the present invention, the inert organic liquid in which the potassium hydroxide is suspended may be any of several compounds; for example, aromatic hydrocarbons such as xylene, tetralin, decalin, and ethylbenzene; aliphatic hydrocarbons such as naphtha and kerosene; and monoethers such as phenyl ether, butyl ether, amyl ether, etc. The inert liquid utilized in the reaction menstruum of the present invention, as far as I have been able to observe, does not enter into or have any perceptible effect on the reaction, but merely serves as a diluent or vehicle for the finely-divided potassium hydroxide, and as a means for removing water from aqueous solutions of potassium hydroxide. It will therefore be apparent that any liquid compound which is substantially water-insoluble and is inert with respect to the reactants and the reaction products can be employed in the reaction menstruums of my invention. Accordingly, the term "inert liquid" appearing in the appended claims is to be specifically understood to be a liquid having the aforesaid properties. Inert liquids which are to be utilized under atmospheric pressure should preferably possess a boiling point of at least about 100° C. However, lower boiling liquids can be used but require the application of superatmospheric pressures in order to obtain the potassium hydroxide in the desired physical state. The quantity of such liquids may vary considerably. They may be employed in considerable excess without having an adverse effect on the activity of the finely-divided potassium hydroxide used in my process. However, for any quantity of potassium hydroxide, I have found that the maximum conversion and reactor output may be secured by using the inert liquid in a proportion just high enough to allow the formation of a menstruum that is sufficiently fluid for satisfactory opeartion at the reaction temperature employed.

Examples of alkynes suitable for use in my process include, but are not limited to, acetylene, propyne, 1-pentyne, phenylacetylene, and the like.

As examples of acetylenic alcohols which may be synthesized in accordance with my invention, there may be mentioned 2-methyl-3-butyne-2-ol, 3-methyl-1-pentyne-3-ol, 2-methyl-3-pentyne-2-ol, 4-ethyl-1-octyne-3-ol, 6-ethyl-3-decyne-5-ol, 1-nonyne-3-ol, 1-hexyne-3-ol, 3,5-dimethyl-1-hexyne-3-ol, and 3-methyl-1-nonyne-3-ol.

My invention may be further illustrated by the following specific examples:

Example I

A mixture consisting of 558 ml. of xylene, 42 ml. of butanol, and 187 grams of potassium hydroxide (U. S. P. pellets, containing 13 per cent water) was refluxed for 15 minutes at a temperature of 140° C., during which time two liquid layers were formed. The mixture was then cooled to −10° C. in the presence of agitation, and thereafter, 16.9 grams of acetylene and 37.6 grams of acetone were added successively. Agitation was continued for approximately 15 minutes, and then 364 ml. of water was added to hydrolyze the product. The result was two liquid layers, the upper layer containing xylene, butanol, and 2-methyl-3-butyne-2-ol, and the lower layer containing potassium hydroxide, water, and a small quantity of 2-methyl-3-butyne-2-ol. For the sake of convenience in the laboratory, the two layers were separated before distillation, the upper layer was treated with solid carbon dioxide to neutralize entrained potassium hydroxide, and it was then distilled. The lower layer was distilled under vacuum at a liquid temperature below 90° C. The 2-methyl-3-butyne-2-ol, isolated in this manner, amounted to 50.2 grams, representing a yield of 92.2 per cent, based upon the acetone consumed, and a reactor output of 73.4 grams per liter of menstruum.

Example II

A mixture consisting of 558 ml. of butyl ether, 42 ml. of butanol, and a solution of 163 grams of pure potassium hydroxide in 388 ml. of water was heated, and the water was removed therefrom in the form of its azeotrope with butyl ether, the latter being separated from the distillate and continuously returned to the still kettle. After water had stopped coming over in the distillate, two liquid layers remained in the kettle. These layers were then cooled to −10° C. in the presence of agitation and to the resulting menstruum were added successively 13.0 grams of acetylene and 29.0 grams of acetone. The resultant mixture was next hydrolyzed as previously described, and from the hydrolyzed material a total of 41.5 grams of 2-methyl-3-butyne-2-ol was isolated by means of vacuum distillation, representing a conversion of 98.8 per cent, based on the acetone used, and a reactor output of 60.9 grams per liter of menstruum.

It is emphasized that the presence of an alcohol within the reaction menstruum is essential, and it is furthermore necessary that the mixture of water-insoluble inert liquid, alcohol, and potassium hydroxide be heated and then cooled prior to the introduction of 1-alkyne. Otherwise, the yield of acetylenic alcohol is virtually nil. These points are demonstrated by the following examples:

Example III

A mixture consisting of 187 grams of potassium hydroxide (U. S. P. pellets, containing 13 per cent water) and 558 ml. of xylene, the latter specially purified to remove all traces of alcohols, was refluxed for 15 minutes at a liquid temperature of 140° C., during which time two liquid layers were formed. The mixture was then cooled to −10° C. in the presence of agitation. The resulting menstruum was saturated with acetylene, 5.8 grams being absorbed, and subsequently 13.0 grams of acetone were added. The resultant mixture, formed in this manner, was then processed as described in Example I, but no 2-methyl-3-butyne-2-ol was detected in it.

Example IV

A mixture consisting of 187 grams of potassium hydroxide (U. S. P. pellets, containing 13 per cent water) and 558 ml. of xylene was heated until two liquid layers formed. Thereafter, the resultant two-phase liquid mixture was cooled to −10° C. in the presence of agitation; then 42 ml. of butanol was added. The resulting menstruum was saturated with acetylene, 6.7 grams being absorbed, and subsequently 15.0 grams of acetone was added. The resultant mixture, formed in this manner, was then processed in accordance with the procedures of Example I. One-half gram of 2-methyl-3-butyne-2-ol was isolated, representing a conversion of 2.3 per cent, based on acetone, and a reactor output of 0.7 gram per liter of menstruum.

Example V

A reaction menstruum was prepared exactly as described in Example IV, with one modification of procedure: The butanol was added to the mixture of potassium hydroxide and xylene before heat was applied. The mixture was then refluxed 15 minutes and cooled in the presence of agitation. To the resulting menstruum were successively added 15.4 grams of acetylene and 34.3 grams of acetone, and the crude reaction product was processed as described in Example I. A total of 47 grams of 2-methyl-3-butyne-2-ol was isolated, representing a yield of 94.5 per cent, based on acetone, and a reactor output of 68.8 grams per liter of menstruum.

The results appearing in the table below demonstrate typical carbonyl compounds that may be utilized in my process, and also indicate the various reaction conditions utilized in obtaining optimum conversions. In this series of experiments, a total of 558 ml. of water-insoluble inert liquid, 42 ml. of the alcohol, and 187 grams of potassium hydroxide (U. S. P. pellets, containing 13 per cent water) were employed. This mixture was refluxed for fifteen minutes and then cooled to −10° C. in the presence of agitation, at which temperature the acetylene was absorbed.

presence of agitation, and then saturated with acetylene. Acetone, corresponding to the molecular amount of acetylene absorbed, was then introduced at a temperature of −10° C. The crude reaction mixture was subsequently processed in accordance with the procedure outlined in Example I, and the 2-methyl-3-butyne-2-ol was isolated.

*Table I*

| Carbonyl compound | Product | Medium | Alcohol | Reaction Temp., °C. | Reaction Time, hr. | Acetylene absorption ft.³, STP | Ratio acetylene to carbonyl compound, moles/mole | Conversion,° percent | Menstruum output,† g/l. |
|---|---|---|---|---|---|---|---|---|---|
| Acetone | 2-methyl-3-butyne-2-ol | Xylene | Butanol | −10 | 0.25 | 0.514 | 1.00 | 92 | 73.5 |
| Ethyl methyl ketone | 3-methyl-1-pentyne-3-ol | Butyl ether | Isoamyl alcohol | −10 | 0.25 | 0.397 | 1.07 | 95.6 | 64 |
| Isobutyl methyl ketone | 2,5-dimethyl-1-hexyne-3-ol | Xylene | Butanol | 0 | 0.25 | 0.650 | 1.00 | 75 | 114 |
| Hexyl methyl ketone | 3-methyl-1-nonyne-3-ol | do | do | 30 | 1.0 | 0.481 | 1.00 | 71.2 | 93 |
| Butyraldehyde | 1-hexyne-3-ol | do | Isobutyl alcohol | −10 | 0.25 | 0.500 | 1.00 | 100 | 95 |
| Heptaldehyde | 1-nonyne-3-ol | Butyl ether | Butanol | 30 | 4.0 | 0.530 | 1.00 | 13 | 17.8 |
| 2-ethylhexaldehyde | 4-ethyl-1-octyne-3-ol | Xylene | do | 25 | 1.0 | 0.480 | 1.00 | 24 | 33 |

° Basis, carbonyl compound.
† Weight of product per unit volume of menstruum.

The data appearing in the table below illustrate the ability of various alcohols, when heated with potassium hydroxide and a suitable inert liquid, to form reaction menstruums suitable for condensing acetylene with acetone to form 2-methyl-3-butyne-2-ol. In this series of experiments, the reactor charge consisted of 558 ml. of redistilled xylene, 187 grams of potassium hydroxide (U. S. P. pellets, containing 13 per cent water), and 42 ml. of the specified alcohol. In each case the runs were carried out in accordance with the procedure outlined in Example I.

*Table II*

| Alcohol | Conversion,° percent | Menstruum output,† g./l. |
|---|---|---|
| None | 0.0 | 0.0 |
| 1-propanol | 83.0 | 25.8 |
| 1-butanol | 95 | 68.8 |
| Tert.-butyl alcohol | 66 | 15.5 |
| Isobutyl alcohol | 45 | 45.0 |
| 2-butanol | 81 | 46.9 |
| Methylallyl alcohol | 83 | 45.0 |
| 3-methyl-1-butanol (isoamyl alcohol) | 93 | 69.7 |
| 2-methyl-2-pentanol | 59 | 29.2 |
| 1-octanol | 66 | 28.8 |
| 2-octanol | 78 | 25.2 |
| Ethylene glycol monoethyl ether | 86 | 58.8 |
| Diethylene glycol monoethyl ether | 94 | 34.1 |
| Cyclohexanol | 76 | 34.7 |
| Tetrahydrofurfuryl alcohol | 86 | 33.6 |
| Phenol | 64 | 32.9 |

° Basis, acetone.
† Weight of product per unit volume of menstruum.

In the table which follows, results are shown demonstrating the use of various inert liquids that may be utilized as a medium for preparing a menstruum suitable for condensing carbonyl compounds with acetylene in accordance with my invention. In all of these experiments, the reactor charge consisted of 558 ml. of medium, 42 ml. of butanol, and 187 grams of potassium hydroxide (U. S. P. pellets, containing 13 per cent water). This mixture was refluxed for a period of 15 minutes, cooled to −10° C. in the

*Table III*

| Medium | Acetylene absorption ft.³, STP | Ratio acetylene to acetone, moles/mole | Conversion,° percent | Menstruum output,† g./l. |
|---|---|---|---|---|
| Xylene | 0.469 | 1.00 | 95 | 68.8 |
| Apcothinner ‡ | 0.471 | 1.00 | 71 | 52.1 |
| Butyl ether | 0.396 | 1.00 | 99 | 60.8 |
| Tetralin | 0.500 | 1.00 | 81 | 62.8 |
| Decalin | 0.385 | 1.00 | 58 | 34.6 |

° Basis, acetone.
† Weight of product per unit volume of menstruum.
‡ Aliphatic naphtha boiling around 140° C.

While the above examples are illustrative of certain monohydric alcohols capable of producing high yields of acetylenic alcohols in accordance with my invention, it is to be specifically understood that I do not desire to be limited thereto, since it is obvious that there are other alcohols in addition to those named that will likewise be satisfactory for use in my process. Also, it is to be understood that the inert liquids in which the potassium hydroxide is suspended are not limited to those specifically mentioned herein, since other similar materials will at once be apparent to those skilled in the art. Moreover, when employing an aqueous solution of potassium hydroxide in accordance with the process of my invention, the activating alcohol need not be added until all of the free water has been removed from the mixture. In general, it may be said that any modifications or equivalents that would naturally occur to those skilled in the art are included within the scope of my invention.

Having described my invention, what I claim is:

1. In the synthesis of acetylenic alcohols, the process which comprises heating a mixture consisting essentially of potassium hydroxide, a small proportion of a monohydric alcohol containing from 3 to 11 carbon atoms, and an organic liquid which forms an azeotrope with water, which is inert to the reactants and reaction products, and which has a boiling point of at least about 100° C., to the point at which the potassium hydroxide is at least partially melted, cooling the mixture while agitating it to produce a suspension of finely divided solid particles of potassium hydroxide, cooling the suspension, absorbing therein a 1-alkyne having a hydrogen atom in the one-position, introducing a carbonyl compound selected from the group consisting of aliphatic aldehydes containing from 4 to 8 carbon atoms and aliphatic ketones to produce the potassium derivative of the corresponding acetylenic alcohol, hydrolyzing the said potassium derivative with water to produce the corresponding acetylenic alcohol, and separating the latter.

2. The process of claim 1 wherein said organic liquid is butyl ether.

3. In the synthesis of acetylenic alcohols, the process which comprises heating a mixture consisting essentially of potassium hydroxide, a water-insoluble liquid hydrocarbon which forms an azeotrope with water, which is inert to the reactants and reaction products, and which has a boiling point of at least about 100° C., and from about two to thirty-five per cent of a monohydric alcohol containing from three to eleven carbon atoms until the potassium hydroxide is at least partly melted, cooling the menstruum while agitating the same to produce a suspension of finely divided solid particles of potassium hydroxide, absorbing acetylene in the suspension, introducing a carbonyl compound selected from the group consisting of aliphatic aldehydes having from four to eight carbon atoms, and aliphatic ketones to produce the potassium derivative of the corresponding acetylenic alcohol, hydrolyzing the said potassium derivative with water to the corresponding acetylenic alcohol, and separating the latter.

4. The process of claim 3 wherein said liquid hydrocarbon is xylene.

5. The process of claim 3 wherein said liquid hydrocarbon is an aliphatic naphtha boiling at approximately 140° C.

6. The process of claim 3 wherein said carbonyl compound is acetone and the acetylenic alcohol formed is 2-methyl-3-butyne-2-ol.

7. The process of claim 3 wherein said carbonyl compound is butyraldehyde and the acetylenic alcohol formed is 1-hexyne-3-ol.

8. The process of claim 3 wherein said carbonyl compound is isobutyl methyl ketone and the acetylenic alcohol formed is 3,5-dimethyl-1-hexyne-3-ol.

9. In a process for the synthesis of acetylenic alcohols, the steps which comprise conducting the azeotropic distillation of an aqueous mixture of potassium hydroxide, a small proportion of a monohydric alcohol containing from 3 to 11 carbon atoms, and a water-insoluble liquid hydrocarbon having a boiling point of at least about 100° C., while separating the water from the distillate and returning to the still the said alcohol and hydrocarbon, thereby dehydrating the potassium hydroxide, cooling the mixture while agitating it to produce a suspension of finely divided solid particles of potassium hydroxide, absorbing acetylene in the cooled suspension, introducing a carbonyl compound selected from a group consisting of aliphatic aldehydes having from 4 to 8 carbon atoms and aliphatic ketones to give the potassium derivative of the corresponding acetylenic alcohol, hydrolyzing the said potassium derivative with water to the corresponding acetylenic alcohol, and recovering the latter.

EVERET F. SMITH.